Oct. 23, 1934.　　J. R. HOTCHKIN　　1,978,364
SPRING NUT
Filed March 28, 1934　　2 Sheets-Sheet 1

INVENTOR-
J. Rowland Hotchkin
BY
Ramsey & Kent
his ATTORNEYS

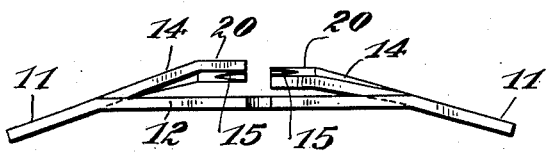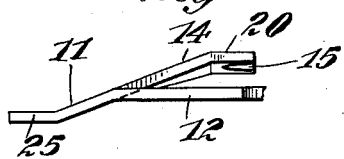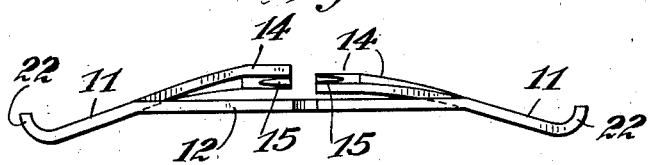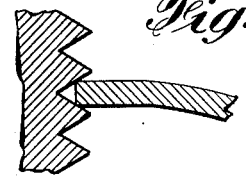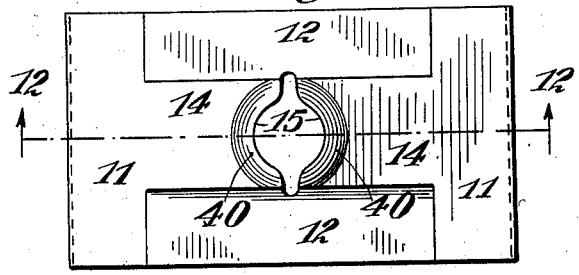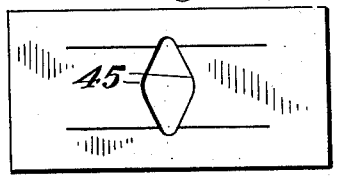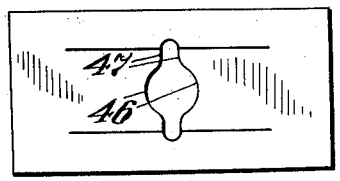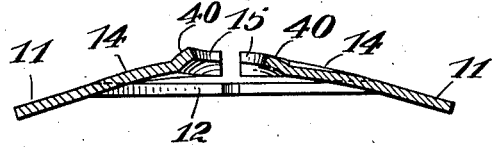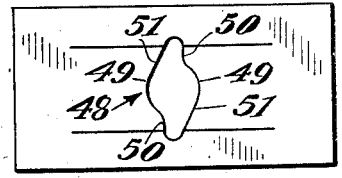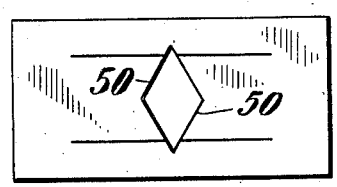

Patented Oct. 23, 1934

1,978,364

UNITED STATES PATENT OFFICE 1,978,364

SPRING NUT

James Rowland Hotchkin, Upper Montclair, N. J., assignor to The Palnut Company, Irvington, N. J., a corporation of New Jersey Application March 28, 1934, Serial No. 717,774

7 Claims. (Cl. 85—36)

This invention relates to improvements in spring fastening devices and more particularly to spring nuts.

An object of the invention is to provide a new, simple and efficient spring nut which can be manufactured inexpensively.

Another object of the invention is to provide a spring nut of such character that it can be manufactured from heat treated tempered spring steel in strip form.

A further object of the invention is to provide a spring nut of such character that its locking pressure increases progressively as the nut is tightened against a surface.

A nut in accordance with the present invention is made of rectangular section of strip spring steel and is composed of end portions joined by bridge portions and tongues extending upwardly between the bridge portions. The end portions are bent downwardly in such fashion that the tongues extend upwardly therefrom with at least part thereof in alignment with the ends or in parallelism with the ends. The radii of curvature where the ends are bent downward from the bridge portions are made so sharp that when the ends are bent downwardly the spring steel is stressed beyond its elastic limit so that the ends retain their bent down form. As a result of this construction, an end of a nut and the tongue in line therewith, form what may be called a lever with the bridge portion of the nut serving as a fulcrum for movement of the lever. Thus when a nut is tightened against a surface the ends are moved outwardly with an action corresponding to the application of a lifting force at the extreme end of the lever, which force is transmitted to bend the tongues inwardly and downwardly relative to the bridge portions.

The bending moment required to lock the nut is produced by the pressure of the screw thread downward at the inner end of the tongues and the upward reaction pressure at the outer end of the end portions. These forces act about twice as far apart as in the case of a nut with the bridge and end portions in the same plane, where the downward pressure is at the same point but where the reaction pressure comes at the junction of the tongue and the end portion only about half as far from the line of the downward pressure as in this improved design. The forces to produce the same bending moment in this improved design can therefore be only half as great due to the double length lever on which they act. This reduction in pressure required to depress the tongues avoids the danger of the tongue ends slipping over or climbing into the next thread, which would render the nut useless.

The angle of pressure in a nut of this general character is definitely limited and must be kept below the maximum angle at which the tongue end would climb out of the thread instead of depressing and locking. In this improved design the end of the tongue can be about twice as far from the surface held, for a given tooth angle, as in the case of a nut with end and bridge portions in the same plane. This gives this improved nut greater resilience because the tongue ends move through a greater distance and maintain their pressure on the screw longer if it should be partially loosened for any reason.

Other objects, features, and advantages of the invention will become apparent by reference to the following detail description taken in conjunction with the following drawings forming a part of the same in which Fig. 1 is a plan view of a spring nut embodying the invention.

Figs. 7, 8 and 9 are side elevations of modifications of the invention.

Fig. 10 is a fragmentary side elevation of a further modification.

Fig. 11 is a plan view of a still further modification.

Fig. 12 is a section taken substantially on the line 12—12 of Fig. 11.

Figs. 13, 14, 15 and 16 are top views of blanks showing various types of recesses in the tongues.

Fig. 17 is a side view showing one manner in which a bolt may be engaged by a tongue.

Figure 1:
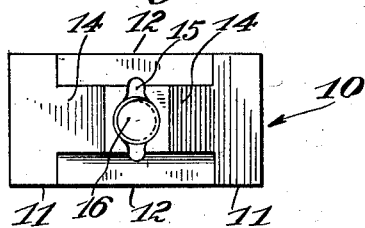
Figure 3:
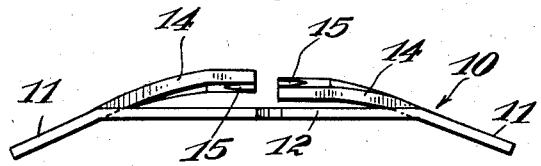
Fig. 3 is an enlarged side elevation of the nut shown in Fig. 1.
Figure 2:
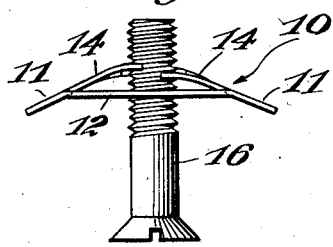
Fig. 2 is a side elevation of an assembly of nut and bolt.

Referring now to the drawings and particularly to Figs. 1 to 3, 10 indicates generally a spring nut embodying the invention, such nut being composed of end portions 11, bridge portions 12 joining the end portions, and tongues 14 lying between the bridge portions 12. As will be apparent from Figs. 2 and 3, the bridge portions 12 are flat while the end portions 11 are also flat but lie in planes at angles to the plane of portions 12. The tongues 14 extend upwardly substantially in line with the end portions 11, but as shown in Figs. 2 and 3 part of the tongues may be slightly arched while the extremities thereof are flat and bent to lie substantially parallel to the bridge portions 12. The angle of bend of the ends 11 relative to the bridge portions 12 is such that the metal of the device is stressed beyond its elastic limit so that once the ends have been bent down from the plane of the bridge portions, they will maintain such angularity relative to the bridge portions. The ends of the tongues 14 are provided with recesses 15 whereby a bolt 16 may be engaged by the ends of the tongues. In order that the ends of the tongues may engage in threads on the bolt, the tongues are twisted in such fashion that ends of the tongues will ride in bolt threads when there is rotation either of the nut or of the bolt. In other words, the tongues are so twisted that their ends follow the pitch of the bolt threads.

Figure 4:
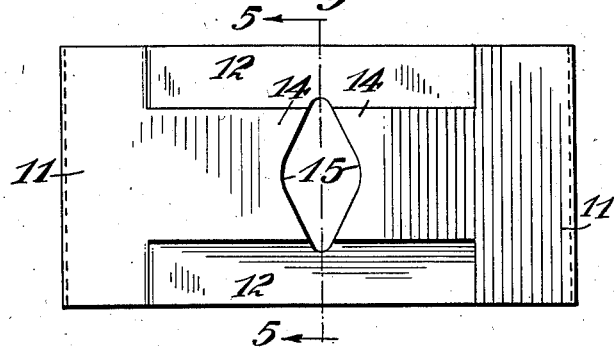
Fig. 4 is a plan view of a slightly modified form of spring nut.
Figure 5:
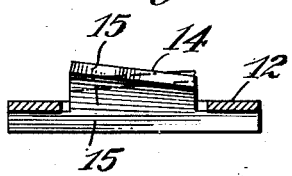
Fig. 5 is a section taken substantially on the line 5—5 of Fig. 4.
Figure 6:
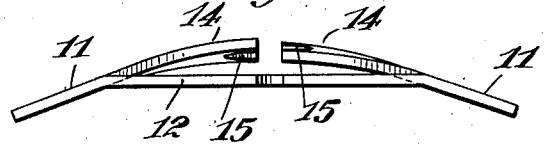
Fig. 6 is a side elevation of the nut shown in Fig. 4.

In Figs. 4, 5 and 6 a slightly different arrangement is shown in that the tongues 14 are arched substantially throughout their length and are not provided with flat portions at their extremities as in the case of the embodiment shown in Figs. 1 to 3. The twist of the tongues is shown clearly in Fig. 5 wherein the end of one tongue is shown in solid lines and the end of the other tongue is shown in broken lines.

Figure 7:
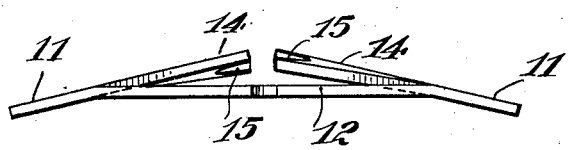

A further modification is shown in Fig. 7, such devices differing from those previously described, in that the tongues 14 are straight instead of being arched, the tongues being substantially in line with the ends 11 throughout their length.

In Fig. 8 a modified form is shown, such form being similar to that of Fig. 7 with the exception that the ends of the tongues 14 are provided with flat portions 20 substantially parallel to the bridge portions 12.

In the modification shown in Fig. 9, the construction is similar to that of Fig 3 with the addition of rounded extremities 22 for the end members 11. These extremities with their rounded portions provide good surfaces for sliding movement of the ends 11 when they are tightened against a surface to be confined.

Fig. 10 shows a modification of the invention similar to Fig. 8 with the exception that a portion of each end 11 is bent as at 25 to lie substantially parallel to the bridge portions 12.

In Figs. 11 and 12 another form of the invention is shown, the device consisting of bridge portions 12 joining ends 11 and slightly arched tongues 14 as in Fig. 3. This form differs from the form shown in Fig. 3 in that the inner portions of each tongue 14 are cupped upwardly as at 40, and the cup portions are given a spiral twist to insure that the ends of the tongues will seat properly in threads on a bolt.

In Figs. 13 to 16 inclusive, various forms of tongue recesses are shown, these figures being representations of blanks cut from strips of spring metal before the ends and the tongues are bent into final form. Fig. 13 shows recesses 45 of modified ovate form. Fig. 14 shows recesses 46, the central part of which are of arcuate form and the extremities of which are straight as at 47 and spaced apart in parallelism. In Fig. 15 each recess 48 consists of an arcuate portion 49, a straight portion 50 and a tangential portion 51. In Fig. 16 the recesses 55 are so shaped that they present a diamond in the blank.

In Fig. 17 the relative proportions between thickness of tongues and size of threads on a bolt are shown. For example, if the bolt is provided with twenty four threads per inch, the tongue should be approximately of .022" thickness. With such proportions it will be seen that the ends of the tongues will fit in the threads with the edges of the tongue ends engaging the walls of a dihedron formed by the threads. The engagement between tongue edges and thread walls is far enough inside the apex of the threads so as to prevent the tongue slipping out of engagement with the threads.

In all forms of the invention shown, certain advantages are inherent. To begin with, the devices can all be made from strips of tempered spring steel or other spring metal with the result that heat treatment of individual finished nuts becomes unnecessary. Another advantage resides in the provision of turned down ends with which the tongues are substantially in line. Due to the sharpness of the bend between the ends and the bridge portions and to the tongues being in line with the ends, each nut is in effect provided with levers made up of the ends and the tongues, as units, which levers are fulcrumed about the ends of the bridge portions. When a nut is tightened against a surface to be retained, the end portions tend to move outwardly from the axis of the bolt engaged by the tongues with the result that the tongues move downwardly about the fulcrum and inwardly thereby gripping the bolt with progressively increasing force. The term "substantially in line" used in the specification and claims to describe the relation between the end portions and the tongues is meant to cover structures wherein the continuity of surface of the end portions and tongues may be interrupted by slight bends or waves due to manufacturing processes and the term is not to be construed as limiting the invention to devices having end portions and tongues with continuous uninterrupted surfaces.

I claim:

1. A spring nut of the type described comprising a generally rectangular member of thin spring metal having ends, flat bridge portions connecting the ends, and tongues extending from the ends between the bridge portions, said ends being bent downwardly and outwardly, said tongues extending upwardly and inwardly with parts thereof substantially in line with said ends.

2. A spring nut of the type described comprising a generally rectangular member of thin spring metal having ends, flat bridge portions connecting the ends, and tongues extending from the ends between the bridge portions, said ends being bent downwardly and outwardly, said tongues extending upwardly and inwardly with parts thereof substantially in line with said ends and with the inner portions thereof substantially parallel to said bridge portions.

3. A spring nut of the type described comprising a generally rectangular member of thin spring metal having ends, flat bridge portions connecting the ends, and tongues extending from the ends between the bridge portions, said ends being bent downwardly and outwardly, said tongues extending upwardly and inwardly with parts thereof substantially in line with said ends and with the inner portions thereof substantially parallel to said bridge portions and having intermediate portions slightly arched.

4. A spring nut of the type described comprising a generally rectangular member of thin spring metal having ends, flat bridge portions connecting the ends, and tongues extending from the ends between the bridge portions, said ends being bent downwardly and outwardly, said tongues extending upwardly and inwardly with parts thereof substantially in line with said ends, said tongues being slightly arched throughout most of their length.

5. A spring nut of the type described comprising a generally rectangular member of thin spring metal having ends, flat bridge portions connecting the ends, and tongues extending from the ends between the bridge portions, said ends being bent downwardly and outwardly, said tongues extending upwardly and inwardly with parts thereof substantially in line with said ends, said tongues being substantially straight throughout their length.

6. A spring nut of the type described comprising a generally rectangular member of thin spring metal having ends, flat bridge portions connecting the ends, and tongues extending from the ends between the bridge portions, said ends being bent downwardly and outwardly, said tongues extending upwardly and inwardly with parts thereof substantially in line with said ends, said tongues having their end portions formed into a cup-shape twisted to follow bolt threads.

7. A spring nut of the type described comprising a generally rectangular member of thin spring metal having ends, flat bridge portions connecting the ends, and tongues extending from the ends between the bridge portions, said ends being bent downwardly and outwardly, said tongues extending upwardly and inwardly with parts thereof substantially in line with said ends, said tongues and ends forming levers fulcrumed at the ends of said bridge portions.

J. ROWLAND HOTCHKIN.